J. B. YOUNG.
THERMOMETER CASE.
APPLICATION FILED SEPT. 7, 1912.
1,099,629.
Patented June 9, 1914.
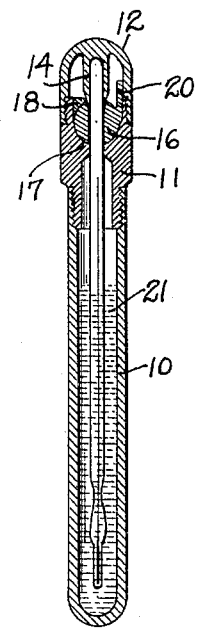
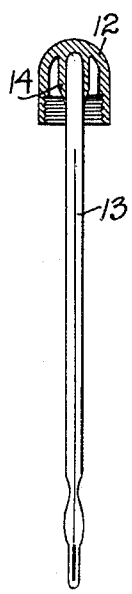
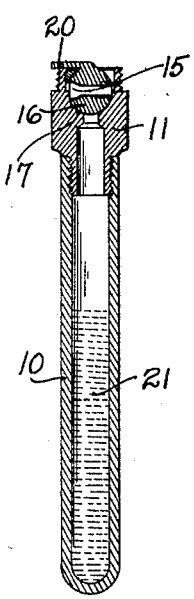
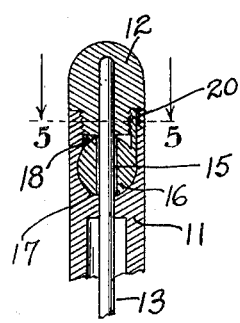
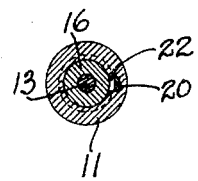
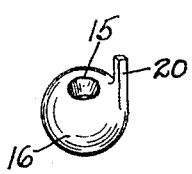
WITNESSES:
INVENTOR.
James B. Young.
BY
V. H. Lockwood
ATTORNEY.
COLUMBIA PLANOGRAPH CO., WASHINGTON, D. C.

UNITED STATES PATENT OFFICE.

JAMES B. YOUNG, OF CUMBERLAND, INDIANA.

THERMOMETER-CASE.

1,099,629.  Specification of Letters Patent.  Patented June 9, 1914.

Application filed September 7, 1912. Serial No. 719,217.

*To all whom it may concern:*

Be it known that I, JAMES B. YOUNG, a citizen of the United States, and a resident of Cumberland, county of Marion, and State of Indiana, have invented a certain useful Thermometer-Case; and I do hereby declare that the following is a full, clear, and exact description thereof, reference being had to the accompanying drawings.

The object of this invention is to improve the construction of antiseptic thermometer cases, over the construction set forth in my former Patent No. 1,031,901, dated July 9, 1912.

One feature of the invention is the position of means within the thermometer case for operating the valve which closes the case when the thermometer is removed and prevents the escape of the antiseptic fluid therein. With an external means for operating said valve there is danger of the valve being manipulated while the thermometer is in the case and thus breaking the thermometer. Furthermore the external means for operating the valve is in the way of the hand while manipulating the thermometer case.

Another feature of the invention consists in providing a removable cap for the case which covers and obscures the means for operating the valve, but when removed, leaves said valve operating means exposed so as to be readily operated.

Another feature consists in providing means for locking the valve in its open position so that it cannot be moved while the thermometer is extending through it.

Another feature of the invention consists in providing a shoulder for engaging a tapering valve seat for effecting a tight joint between the thermometer and valve to prevent the escape of antiseptic fluid, and this shoulder and thermometer are preferably connected with a cap so that as the cap is screwed down, the joint will be rendered tight and the parts held in a close position. The ball valve will also be forced firmly against the seat in the casing rendering leakage impossible.

The nature of the invention will be understood from the accompanying drawings and the following description and claims:

In the drawings, Figure 1 is a central vertical section through the thermometer case showing the thermometer therein and the case closed. Fig. 2 is an elevation of the thermometer with a section through the cap, said parts being removed from the case. Fig. 3 shows the condition of the case after the thermometer is removed, the valve being closed. Fig. 4 shows a modified form with an internal plug cap instead of an external cap. Fig. 5 is a section on the line 5—5 of Fig. 4. Fig. 6 is a perspective view of the valve.

The antiseptic case is formed of a main portion 10 and an upper valve holding portion 11 which may be screwed together, as shown in Fig. 1, or otherwise secured together. These two portions constitute what is hereafter called the case and upon them there is a cap 12 which is screwed to the portion 11. The cap is secured to the thermometer 13 by an extension 14 which tapers at its lower end to form a shoulder which enters a tapering opening 15 through a valve 16. This valve is a ball valve resting upon a semi-circular seat 17 formed by contracted portions 17 of the valve holding portion 11 of the case. Said seat 17 has an opening through it large enough to admit the thermometer and the opening is enlarged to receive the valve 16. The valve is held from escape by a ring 18 above it. An arm or projection 20 extends from one side of the valve so that the valve may be turned by engaging the part 20 with one's fingers, from the position shown in Fig. 1 to that shown in Fig. 3, and thus the opening at the upper end of the case be closed to prevent the antiseptic fluid 21 from escaping. This is done when the thermometer is removed for use. When it is desired to insert the thermometer, the valve is turned to its normal position and the thermometer is inserted and the cap 12 screwed down and as it screws down, the conical part 14 wedges into the opening 15 of the valve 16. The valve 16 is also locked by a vertical recess 22 being provided in one side of the upper end of the portion 11 of the case in which the arm 20 lies when it is vertical. The cap 12 covers the arm 20 when the cap is in place, but when the cap is removed, the arm projects above the case so that the valve can be turned by merely pushing the arm over from a vertical to a horizontal position.

The modified form shown in Fig. 4 has a cap 12 which screws inside of the portion 11 of the case instead of the outside when it engages and prevents the operation of the extension 20 from the valve and it also completely closes the upper end of the thermometer and prevents leakage when the thermometer does not fit tightly in the valve.

I claim as my invention:

1. A thermometer case adapted to hold fluid and having at its outer end an opening for the insertion of the thermometer, a valve in said case for closing the same, and means wholly within the case and cap for operating the valve.

2. A thermometer case adapted to hold fluid and having at its outer end an opening for the insertion of the thermometer, a ball valve in said case for closing the same, a tangential projection within the case for operating the valve, extending longitudinally of the case when the valve is open and adapted to be turned transversely of the case for closing the valve, and a cap for said case adapted to inclose said valve actuating means.

3. A thermometer case adapted to hold fluid and having at its outer end an opening for the insertion of the thermometer, a ball valve in said case for closing the same, a tangential projection within the case for operating the valve extending longitudinally of the case when the valve is open and adapted to be turned transversely of the case for closing the valve, said case being recessed for receiving said projection and locking it in position and a cap on the thermometer to engage said projection.

4. A thermometer case adapted to contain fluid and with an opening at the upper end for a thermometer, a valve for closing the upper end thereof and provided with an opening through it for the thermometer, said opening in the valve flaring at its outer end, a thermometer, and a cap secured to the outer end of the thermometer adapted to engage the case and having a tapering portion adapted to enter the flaring opening in the valve for closing the latter.

In witness whereof, I have hereunto affixed my signature in the presence of the witnesses herein named.

JAMES B. YOUNG.

Witnesses:
J. H. WELLS,
O. M. McLAUGHLIN.

---

Copies of this patent may be obtained for five cents each, by addressing the "Commissioner of Patents, Washington, D. C."